Aug. 15, 1933.                    R. HARRIS                    1,922,435
                                POULTRY FEEDER
                            Filed Nov. 16, 1929            2 Sheets-Sheet 1

INVENTOR
REX HARRIS
BY A. B. Bowman
ATTORNEY

Aug. 15, 1933.      R. HARRIS      1,922,435
POULTRY FEEDER
Filed Nov. 16, 1929      2 Sheets-Sheet 2
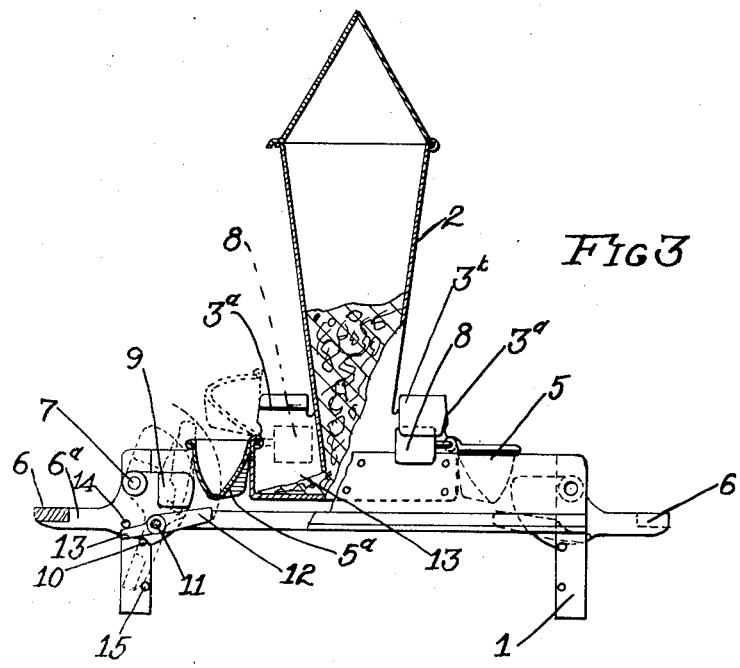
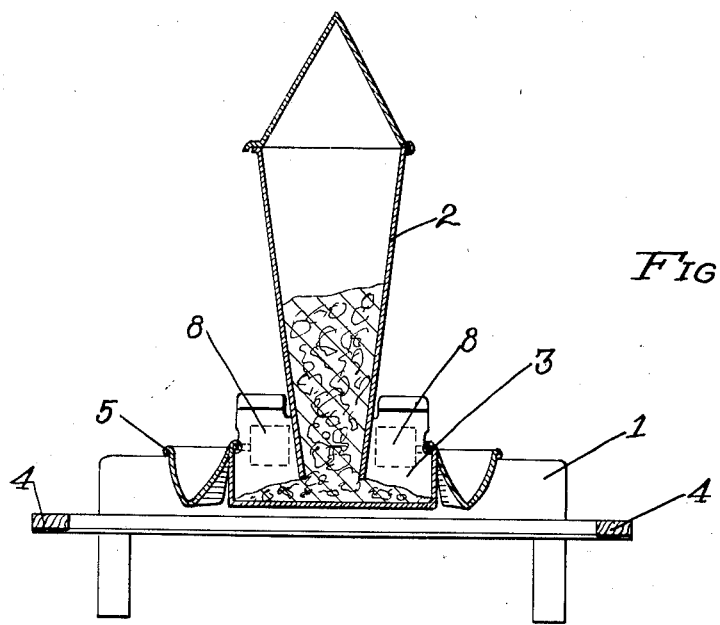
INVENTOR
REX HARRIS
BY A. B. Bowman
ATTORNEY Patented Aug. 15, 1933

1,922,435

UNITED STATES PATENT OFFICE 1,922,435

POULTRY FEEDER

Rex Harris, Colman, S. Dak.

Application November 16, 1929
Serial No. 407,665

10 Claims. (Cl. 119—52)

My invention relates to poultry feeders, and the objects of this invention are: first, to provide a feeder of this class which will reduce waste of feed to a minimum, and which will keep the feed in a clean and sanitary condition; second, to provide a feeder of this class which will reduce to a minimum the tendency of poultry in getting into the feeding receptacle; third, to provide a novel structure for carrying out these purposes, by providing a secondary feed trough or receptacle which is adapted to receive feed scratched from the main feed receptacle or trough and which is periodically dumped; fourth, to provide a feeder of this class in which the dumping of the secondary feed receptacle or trough is effected by the fowl when eating, and a structure in which said secondary feed trough may be dumped by very young and light fowl; and, fifth, to provide as a whole a novelly constructed feeder of this class, and one which is simple and economical of construction proportionate to its functions, durable, and which will not readily deteriorate or get out of order.

Figure 1:
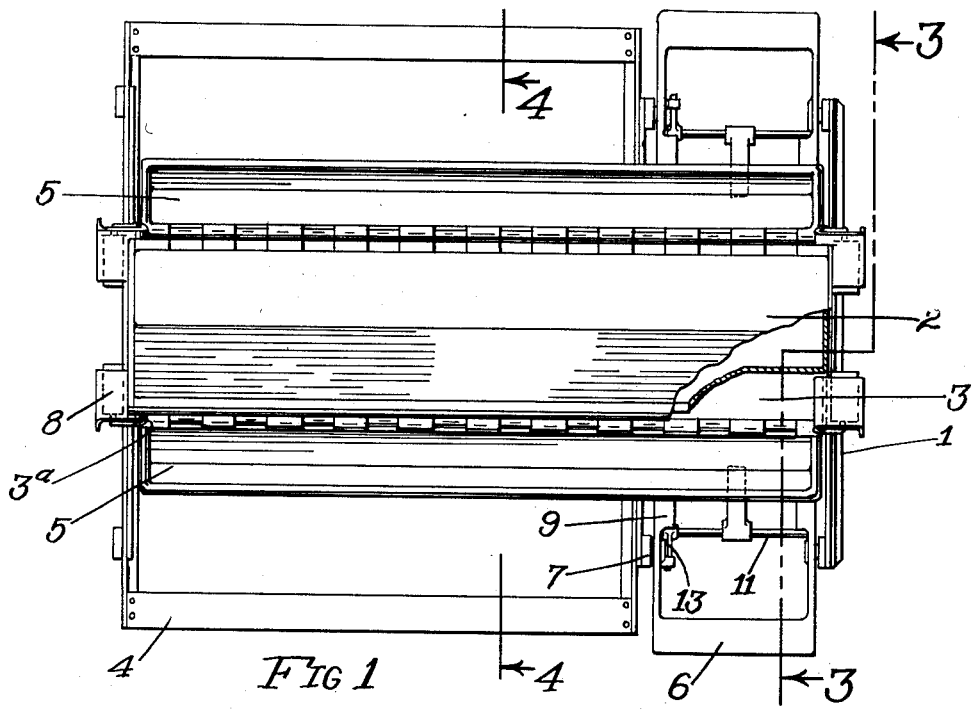
Figure 2:
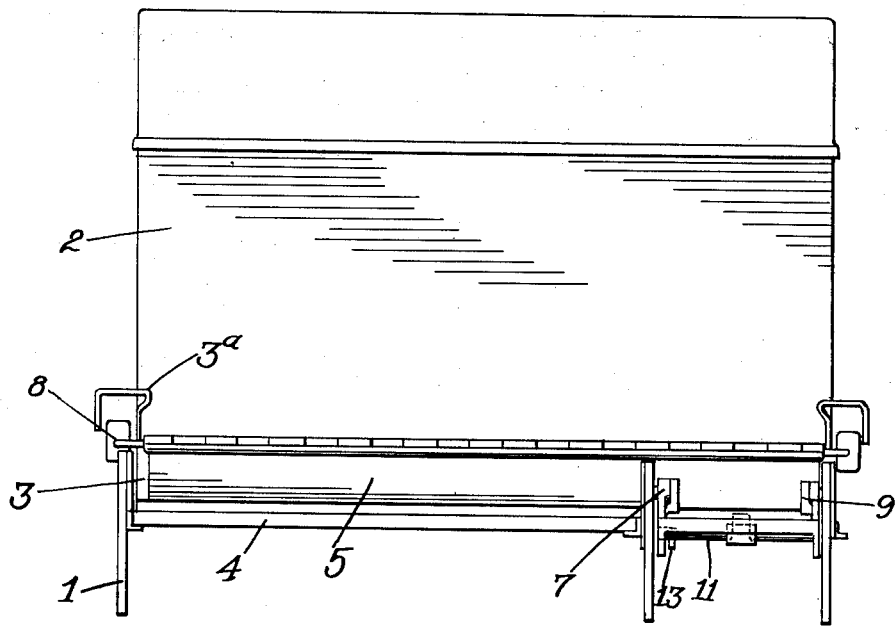

With these and other objects in view, as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a plan view of my feeder in one form of construction, certain parts and portions thereof being broken away and in section to facilitate the illustration; Fig. 2 is a side elevational view thereof; Fig. 3 is a partial sectional and partial end elevational view thereof taken at 3—3 of Fig. 1, and Fig. 4 is a transverse sectional elevational view thereof taken at 4—4 of Fig. 1.

Like characters of reference refer to similar parts and portions throughout the views of the drawings.

A common type of poultry feeder now in use consists of a supporting frame, a bin, and a feeding receptacle positioned at the lower end of the bin and extending to opposite sides thereof forming feed troughs at the opposite sides of the bin. These elements are embodied in the poultry feeder illustrated and are designated in the drawings as members 1, 2 and 3, respectively. The lower side of the bin is spaced from the bottom of the receptacle 3 so that the feed within the bin is fed automatically to the opposite sides thereof within the receptacle 3 as the poultry disposes of the feed at such opposite sides. At the outer sides of the receptacle or trough 3, and spaced considerably therefrom, are perches 4 upon which the poultry may stand when feeding. These perches are supported on and form part of the frame 1.

At the outer side of the trough 3 are pivotally mounted secondary or dumping troughs 5 which extend completely across the long sides of the trough 3 and are pivotally mounted at their inner edges to the upper edges of the long sides of the trough 3. The troughs 5 in their normal positions, as shown in Figs. 3 and 4, are positioned to the outer sides of the receptacle 3 and open at their upper sides. As the chickens, or other poultry, stand on the perches and eat feed from the trough 3, a portion of the feed is scratched by their beaks and feet, or otherwise deposited into the troughs 5. Thus, the feed which is normally wasted is caught by these troughs 5. The troughs 5 are so mounted that when the same are tilted about their pivotal axes, the contents thereof are redischarged into the receptacle 3, the normally inner wall of the troughs 5 being inclined so that when the troughs 5 are raised, as shown by dotted lines in Fig. 3, the contents thereof will be readily discharged. The upper position of said troughs is limited by stops 3a extending upwardly from the end walls of the receptacle 3.

The troughs 5 are raised or dumped periodically by the fowl as the same step or alight on tiltable perches 6. These perches 6 are mounted at one end only of the feeder and are substantially elongations of the stationary perches 4 and are positioned opposite one end of the troughs 5. These movable perches are pivotally mounted on studs or bearings 7 supported by the frame 1. Both the troughs 5 and the perches 6 are counterbalanced by counterbalance weights 8 and 9, respectively, so that only slight force is required to tilt either. The portion of the perch 6 which extends toward the trough 5 from the pivotal mounting is slightly heavier so that the perch will always tend to remain in a horizontal position, such position being maintained by a stop pin 10 on the frame.

The supporting arms 6a of the tiltable perches are connected at their lower portions by a rockshaft 11 on which is mounted a pawl or arm 12 which is adapted to engage the underside of the troughs 5 when the outer end of the perch 6 is lowered. The arm 12 is held in a position to engage the trough 5 by an arm 13 at one end of the rockshaft 11, which arm 13 is adapted to engage a pin 14 on one of the arms 6a for limiting the downward position of the inner end of the arm 12.

If desired, the counterbalance weight 8 may be protected by guards 3b which may be formed by extending the portions of the ends of the receptacle 3, which form the stops 3a, outwardly.

The operation of my feeder is briefly as follows:

When a chicken, or other fowl, alights on one of the perches 6, the same is immediately tilted permitting the inner end of the arm 12 to engage the underside of the corresponding trough 5 tilting the same about its pivotal axis. Said end of the arm 12 slides along a cam portion in the form of a fin 5a at the back and under side of the trough. The trough, being balanced, readily tilts to the dotted line position at which time the perch and the pawl means is in the dotted line position. The trough 5 is then permitted to fall back to its former position even though the perch 6 is still in its dotted line position. When the perch 6 falls back, the arm 12 may engage the outer side of the trough and be tilted about its pivotal axis until the perch has fallen back to its normal position. It will be noted that the lower position of the perch 6 is limited by a pin 15 on the frame 1. Thus, the troughs 5 are periodically raised during the process of feeding the poultry and such dumping of the trough 5 takes place only when the poultry is feeding.

Though I have shown a particlular construction, combination and arrangement of parts and portions, I do not wish to be limited to this particular construction, combination and arrangement but desire to include in the scope of my invention the construction, combination and arrangement substantially as set forth in the appended claims.

Having thus described my invention, what I claim as new and desire to secure by Letters Patent is:

1. In a feeder, a stationary trough, a second trough movably mounted at one side of the stationary trough and adapted to tilt for discharging the contents of the second trough into the first trough, and a shiftable perch adapted to be lowered by weight applied thereto and operatively connected to the second trough for tilting the second trough with respect to the stationary trough.

2. In a feeder, a stationary trough, a second trough pivotally mounted at one edge at one side of the stationary trough and adapted to be raised about its pivotal axis for discharging the contents of the second trough into the stationary trough, and a shiftable perch adapted to be lowered at its outer portion and operatively connected to the second trough for tilting the second trough about its pivotal axis.

3. In a feeder, a stationary trough, a second trough movably mounted at one side of the stationary trough and adapted to tilt for discharging the contents of the second trough into the first trough, a perch pivotally mounted adjacent the second trough, and pawl means mounted on the perch for engaging the second trough for tilting the same, the trough being adapted to return to its normal feeding position independently of said perch, and said perch being adapted to return to its normal position after said second trough is returned to its normal position.

4. In a feeder, a stationary feed trough, a second trough pivotally mounted at one edge to one side of the stationary trough, means for counterbalancing the weight of the second trough about its pivotal axis, a perch pivotally mounted adjacent the second trough and adapted to be lowered at its outer portion and operatively connected to the second trough for tilting the second trough about its pivotal axis, and counterbalance means on the perch.

5. In a feeder, a stationary feed trough, a second trough pivotally mounted at one edge to one side of the stationary trough, means for counterbalancing the weight of the second trough about its pivotal axis, a perch pivotally mounted adjacent to and outwardly from the second trough, counterbalance means for counterbalancing said perch about its pivotal axis, stop means for limiting the movement of the perch, and pawl means for engaging the second trough when the perch is tilted for tilting the second trough about its pivotal axis.

6. In a feeder, a frame, a feed receptacle mounted on said frame, a trough pivotally mounted at one side to one side of the receptacle and adapted to be tilted about its pivotal axis and when tilted to discharge the contents of the trough into the receptacle, a stationary perch mounted on the frame at one side of and in spaced relation to said trough, and a movable perch pivotally mounted at one side of the trough beyond the end of the stationary perch, said movable perch being operatively connected to the second trough and adapted to tilt the trough about its pivotal axis.

7. In a feeder, a frame, a feed receptacle mounted on said frame, a trough pivotally mounted at one side to one side of the receptacle and adapted to be tilted about its pivotal axis and when tilted to discharge the contents of the trough into the receptacle, a stationary perch mounted on the frame at one side of and in spaced relation to said trough, a movable perch pivotally mounted at one side of the trough beyond the end of the stationary perch, said movable perch being operatively connected to the second trough and adapted to tilt the trough about its pivotal axis, and counterbalance means on said trough and said movable perch for maintaining the same in horizontal positions.

8. In a feeder, a stationary feed trough, a second trough pivotally mounted at one edge to one side of the stationary trough, means for counterbalancing the weight of the second trough about its pivotal axis, and means operable by the poultry for tilting the second trough about its pivotal axis.

9. In a feeder, a main trough having a second trough positioned at one side thereof, the second trough being movably mounted with respect to the main trough so as to discharge the contents thereof into the main trough when moved, and a perch shiftably mounted adjacent the second trough and adapted to be lowered by weight applied thereto and operatively engaged with the second trough to move the same for discharging the contents of the second trough into the main trough.

10. In a feeder, a main trough having a second trough positioned at one side thereof, the second trough being movably mounted with respect to the main trough so as to discharge the contents thereof into the main trough when moved, and a perch shiftably mounted adjacent the second trough and adapted to be tilted by poultry alighting thereon and operatively engaged with the second trough to move the same for discharging the contents thereof into the main trough.

REX HARRIS.